United States Patent [19]

Chalkley et al.

[11] Patent Number: 5,403,571
[45] Date of Patent: Apr. 4, 1995

[54] PURIFICATION OF ELEMENTAL SULPHUR

[75] Inventors: Michael E Chalkley, St. Albert; Michael J. Collins, Fort Saskatchewan; Manher M. Makwana, Edmonton; Ian M. Masters, Fort Saskatchewan, all of Canada

[73] Assignee: Sherritt Gordon Limited, Edmonton, Canada

[21] Appl. No.: 700,149

[22] PCT Filed: Jun. 5, 1990

[86] PCT No.: PCT/CA90/00187
§ 371 Date: Apr. 9, 1991
§ 102(e) Date: Apr. 9, 1991

[87] PCT Pub. No.: WO90/15021
PCT Pub. Date: Dec. 13, 1990

[30] Foreign Application Priority Data

Jun. 5, 1989 [GB] United Kingdom ............... 8912861

[51] Int. Cl.$^6$ ............................................. C01B 17/02
[52] U.S. Cl. .................................. 423/567.1; 423/99; 423/578.1
[58] Field of Search ............. 423/99, 106, 110, 567 R, 423/576.5, 576.6, 578.1

[56] References Cited

U.S. PATENT DOCUMENTS 3,954,451  5/1976  Kinoshita .................. 75/108

FOREIGN PATENT DOCUMENTS 50-18466  6/1975  Japan ..................... 423/99
52-61196  5/1977  Japan ..................... 423/566.1
55-89436  7/1980  Japan ..................... 423/99
9015021  12/1990  WIPO ..................... 423/567 R Primary Examiner—Gary P. Straub
Assistant Examiner—Timothy C. Vanoy
Attorney, Agent, or Firm—Stevens, Davis, Miller & Mosher

[57] ABSTRACT

A process for removing mercury or other metal impurities from elemental sulphur contaminated therewith includes mixing such elemental sulphur in a molten state with an aqueous sulphide solution or an aqueous solution of sufficiently high pH which reacts with elemental sulphur and forms a sulphide solution to cause extraction of mercury or other metal contaminants from the elemental sulphur into the aqueous sulphide solutions, and separating the aqueous sulphide solution containing mercury or other metal contaminants from the molten elemental sulphur to provide an elemental sulphur product substantially free from mercury and other metal contaminants.

12 Claims, No Drawings

PURIFICATION OF ELEMENTAL SULPHUR

This invention relates to the removal of mercury and possibly other metal contaminants from elemental sulphur contaminated with such metal impurities.

Sulphuric acid is frequently used in food processing, animal feed production and fertilizer manufacture, and it is clearly necessary that sulphuric acid used for this purpose should not contain undesirably high levels of toxic elements such as mercury. Elemental sulphur is commonly used in the manufacture of sulphuric acid on a commercial scale, and thus it is necessary that such elemental sulphur should be relatively free from such contamination. For example, if sulphuric acid is to contain less than 1 gram/tonne (g/t) mercury, which is a requirement now specified for the purposes mentioned above, then elemental sulphur utilized in the production of sulphuric acid must contain less than 3 g/t mercury. Commercially produced elemental sulphur of volcanic origin, or resulting as a by-product of metallurgical operations, for example, zinc pressure leaching, has been found to contain up to about 50 g/t mercury. It is therefore necessary to reduce the mercury content in such elemental sulphur before it can be used in the production of sulphuric acid which is substantially mercury free.

Tests have shown that the mercury is present in solid solution with the elemental sulphur, probably as mercuric sulphide (HgS) in the form of cinnabar (alpha-HgS) or metacinnabar (beta-HgS). No commercially successful way of reducing the mercury content of such commercially produced elemental sulphur to the low level required is known.

It is therefore an object of the invention to provide a process for removing mercury and possibly other metal impurities from elemental sulphur contaminated therewith.

The present invention is based on the discovery that mercury contaminants and possibly other metal contaminants can be removed from elemental sulphur contaminated therewith by mixing the contaminated elemental sulphur in a molten state with an aqueous sulphide solution or an aqueous solution of sufficiently high pH which reacts with elemental sulphur and forms a sulphide solution to cause extraction of mercury and possibly other metal contaminants from the elemental sulphur into the aqueous sulphide solution. The aqueous sulphide solution containing mercury and possibly other metal contaminants is then separated from the molten elemental sulphur to provide an elemental sulphur product substantially free from such mercury and other metal contaminants.

It was previously known that mercuric sulphide is soluble in sodium sulphide solutions and in sodium hydrosulphide solution, especially at high pH, see U.S. Pat. No. 3,213,006 (Crain et al) issued Oct. 19, 1965. and two Papers by Efremova et al, namely Efremova, E. P.; Kuznetsov, V. A.; and Shubnikov, A. V.; "Solubility and Crystallization of Cinnabar under Hydrothermal Conditions", Proc. Int. Symp. Hydrotherm. React., 1982, 317–331 and Efremova, E. P.; Kuznetsov, V. A.; and Shikina, N. D.; "Solubility of Cinnabar (Alpha-HgS) in Hydrosulphide Solutions at High Temperature", Geokhimiya, 1982, 1, 56–63. However, the Crain et al patent is merely concerned with an electrolytic cell process with provision for mercury recovery, and the Efremova et al Papers are merely reports of academic research with respect to "Solubility and Crystallization of Cinnabar under Hydrothermal Conditions" and "Solubility of Cinnabar (Alpha-HgS) in Hydrosulphide Solutions at High Temperature". A method for separating mercuric sulphide from elemental sulphur using alkali solution has also been reported, see Japanese Patent, Kokai No. 52(1977)-61, 196 (Yamamoto and Kamio), but this method involves suspension, rather than dissolution, of mercuric sulphide in the aqueous alkali phase, and the concentration of mercury in the sulphur recovered by this method is in the range of 30 to 220 g/t, far in excess of the quantity acceptable if the sulphur is to be used for sulphuric acid manufacture. None of this prior art is concerned with the problem dealt with in the present application. The discovery that an aqueous sulphide solution could be used to successfully selectively extract trace levels of mercury and possibly other metal contaminants from elemental sulphur by mixing an aqueous sulphide solution with the elemental sulphur in the molten state was completely unexpected, particularly since it was also known that elemental sulphur reacts with sulphide ions to produce polysulphide ions in solution.

According to the invention therefore, a process for removing mercury or other metal impurities from elemental sulphur contaminated therewith comprises mixing such elemental sulphur in a molten state with an aqueous sulphide solution or an aqueous solution of sufficiently high pH which reacts with said elemental sulphur and forms a sulphide solution to cause extraction of mercury or other metal contaminants from the elemental sulphur into the aqueous sulphide solution, maintaining the aqueous sulphide solution at a pH of at least about 9 during contact with the elemental sulphur, and separating the aqueous sulphide solution containing mercury or other metal contaminants from the molten elemental sulphur to provide an elemental sulphur product substantially free from mercury and other metal contaminants.

The preferred solution is an aqueous solution of sufficiently high pH which reacts with elemental sulphur to form a sulphide solution to cause extraction of mercury or other metal contaminants from the elemental sulphur into the aqueous sulphide solution. Such a solution may be sodium hydroxide or ammonium hydroxide solution. The use of such compounds avoids problems, such as transportation and storage problems, associated with the use of sulphides such as sodium sulphide, sodium hydrosulphide, hydrogen sulphide or ammonium sulphide.

It has been found that best results are obtained when the pH of the aqueous solution is maintained at a value of at least about 9 during the extraction and separation steps. Advantageously, a base (for example further sodium hydroxide solution) is added sufficiently near the end of the reaction to increase the pH of the aqueous solution so as to cause redissolution of precipitated mercury or other metal contaminants without significant reaction of the base with elemental sulphur.

The mercury or other metal contaminants may be recovered from the separated aqueous sulphide solution containing such metal contaminants by adjusting the pH of the aqueous sulphide solution to a sufficiently low value to cause precipitation of the mercury or other metal contaminants, and separating the precipitated mercury or other metal contaminants from the remaining aqueous sulphide solution. For this purpose, the pH of the aqueous sulphide solution is advantageously lowered to about 5 by addition of sulphuric acid.

Various tests in accordance with the invention have been carried out. Although the mercury extraction tests were carried out batchwise in an autoclave, the process can be carried out in a continuous manner, for example in a pipeline or in a series of agitated pressure vessels with settlers. In a two-stage process, fresh elemental sulphur feed containing mercury is contacted in a first stage with second stage aqueous extract. After settling of the molten sulphur treated in the first stage, the molten sulphur is contacted with fresh caustic solution in a second stage for dissolution and extraction of residual mercury in the molten sulphur. After settling, the second stage sulphur phase is the purified product. The pH of the second stage aqueous phase is increased by addition of a small quantity of concentrated caustic solution, and this aqueous solution, after separation from the settled molten sulphur, is sent to the first stage. The first stage aqueous phase is treated with dilute sulphuric acid solution to precipitate mercury from the solution.

In view of the test results with respect to mercury removal from elemental sulphur, it is expected that the invention would also be successful in removing other metal contaminants such as arsenic contaminants.

The process of the invention will now be described with reference to the following non-limitative examples.

EXAMPLE 1

Effect of Lixiviant to Mercury Ratio

Elemental sulphur containing about 30 g/t mercury and an aqueous sodium sulphide and/or sodium hydroxide solution with a pH of about 13 were charged into an autoclave. The volume ratio of elemental sulphur to aqueous solution was 1:1. The autoclave was heated to 140° C. and, after 15 minutes at this temperature it was considered that the sulphur was completely molten. Agitation by means of a single axial impeller in the autoclave was then carried out for 10 minutes, and the contents were then allowed to settle for 5 minutes. Molten sulphur was then discharged through a bottom valve in the autoclave.

It is believed that sodium sulphide or sodium hydroxide react with elemental sulphur to provide suitable lixiviant for mercury in accordance with the following reactions.

$$Na_2S + (x-1)S \rightarrow Na_2S_x$$

$$6NaOH + (2x+2)S \rightarrow 2Na_2S_x + Na_2S_2O_3 + 3H_2O$$

$$Na_2S_x + HgS \rightarrow Na_2HgS_{x+1}$$

The quantities of sodium sulphide or sodium hydroxide were varied in four of the tests, as given in the table below.

| Test No. | Charge (g) Sulphur | Charge (g) Na$_2$S | Charge (g) NaOH | Weight Ratio* S$^{2-}$ to Hg | Solution pH Head | Solution pH Product | Hg in Sulphur Head | Hg in Sulphur Product |
|---|---|---|---|---|---|---|---|---|
| 1 | 2000 | 1.6 | — | 10:1 | 12.1 | 7.9 | 37 | 18 |
| 2 | 2000 | — | 12.5 | 55:1 | 13.2 | 9.0 | 31 | 4 |
| 3 | 2000 | 8.1 | 5.0 | 85:1 | 12.9 | 9.5 | 28 | <2 |
| 4 | 2000 | 32.5 | — | 220:1 | 13.2 | 9.3 | 31 | <2 |

*Ratio of sulphide or sulphide equivalent to mercury in the feed

Mercury was extracted from the elemental sulphur phase into the aqueous phase in all of the tests. The quantity of mercury remaining in the sulphur phase was excessively high in the tests with a weight ratio of sulphide, or sulphide equivalent as sodium hydroxide, to mercury of less than 85:1, although a weight ratio of less than 85:1 and greater than 55:1 would likely be sufficient to leave a concentration of less than 3 g/t in the sulphur product. The pH of the aqueous solution is critical to the net extraction of mercury and a solution pH of 9 or greater is required to prevent precipitation of mercury as mercury sulphide and reincorporation of the mercury sulphide into the molten sulphur phase. In Test 1, with addition of 0.8 g sodium sulphide per kg of sulphur, the pH of the solution decreased to 7.9 and the sulphur product retained 18 g/t mercury, compared with <2 g/t mercury in Tests 3 and 4 with a terminal solution pH of 9.3 to 9.5.

EXAMPLE 2

Effect of Retention Time and Staged Addition of Lixiviant

The mixing time in the first example was ten minutes, during which time the pH of the aqueous solution decreased from about 13 to between 7.9 and 9.5. Additional tests were carried out under similar conditions as Example 1, but with variation in the retention time and with staged addition of lixiviant, as given in the table below. The volume ratio of elemental sulphur to aqueous solution was 1:1 in Test 2, and 2:1 in Tests 5 and 6.

| Test No. | NaOH Addition (g/kg S) 0 min | NaOH Addition (g/kg S) 9.5 min | NaOH Addition (g/kg S) 30 min | Retention Time (min) | Solution pH Head | Solution pH Product | Hg in Sulphur (g/t) Head | Hg in Sulphur (g/t) Product |
|---|---|---|---|---|---|---|---|---|
| 2 | 6.25 | — | — | 10 | 13.2 | 9.0 | 31 | 4 |
| 5 | 6.25 | 3.13 | — | 10 | 13.2 | 9.8 | 49 | 2 |
| 6 | 6.25 | — | 3.13 | 1 | 13.2 | — | 12 | 3 |
|   |   |   |   | 5 |   | — |   | 2 |
|   |   |   |   | 10 |   | — |   | 2 |
|   |   |   |   | 15 |   | — |   | 1 |
|   |   |   |   | 20 |   | — |   | 3 |
|   |   |   |   | 30 |   | — |   | 3 |
|   |   |   |   | 31 |   | 9.7 |   | 1 |

The addition of sodium hydroxide lixiviant was staged in Test 5, so that one third was added after 9.5 minutes. The solution at 10 minutes had a pH of 9.8 in Test 5, compared with 9.0 in Test 2, and the mercury content of the sulphur product was lower with the higher terminal solution pH. The rate samples collected in Test 6 revealed that the bulk of the mercury is extracted in the first minute of contact, that mercury may be reincorporated into the sulphur phase as the retention time exceeds 15 minutes, and that the reincorporated mercury may be rapidly extracted back into the aqueous phase by addition of a second portion of sodium hydroxide. It is apparent that optimum results can be obtained with a total retention time of about 2 minutes, with a portion of the sodium hydroxide solution added about 30 seconds prior to completion of mixing. Such addition of NaOH near the end of mixing raises the pH to cause redissolution of any precipitated mercuric sulphide, but there is insufficient time for the further base to be consumed by reaction with elemental sulphur.

EXAMPLE 3

Effect of Temperature

Because the elemental sulphur must be molten to ensure effective mixing with the aqueous sulphide solution, the temperature has to be in the range of from about 120° C. to about 155° C. Below about 120° C. sulphur is a solid and, above 155° C., molten sulphur becomes very viscous. Test 8 was conducted at 125° C. and the results from this test are compared with the results for tests at 140° C. in the table below. The reagents were sodium hydroxide in Test 2, as described above, a mixture of sodium sulphide and sodium hydroxide in Test 7, and sodium sulphide alone in Test 8.

| Test No. | NaOH* Addition (g/kg S) | Temperature (°C.) | Retention Time (min) | Solution pH Head | Solution pH Product | Hg in Sulphur (g/t) Head | Hg in Sulphur (g/t) Product |
|---|---|---|---|---|---|---|---|
| 2 | 6.25 | 140 | 10 | 13.2 | 9.0 | 31 | 4 |
| 7 | 6.81 | 140 | 10 | 12.9 | 9.6 | 28 | 3 |
| 8 | 6.25 | 125 | 10 | 13.0 | 9.9 | 26 | <1 |

*Or equivalent as sodium sulphide

Increased net mercury extraction was obtained at 125° C. It would appear that although the reaction of mercuric sulphide with aqueous sulphide is rapid at this temperature, the reaction of elemental sulphur with caustic is less rapid than at 140° C. As caustic is less readily consumed at 125° C., the pH of the aqueous solution may be maintained at a higher level, and mercury is better stabilized in the aqueous solution.

EXAMPLE 4

Precipitation of Mercury from Aqueous Solution

Leach solutions from the sulphur contact tests were treated with dilute sulphuric acid at 85° C. to yield final solutions with a pH of about 5. Representative tests are described in the table below.

| Test No. | Temperature °C. | Retention Time (min) | $H_2SO_4$ Addition (g/L) | Hg in Solution (mg/L) Head | Hg in Solution (mg/L) Product |
|---|---|---|---|---|---|
| 9 | 85 | 30 | 11 | 97 | <1 |
| 10 | 85 | 10 | 29 | 59 | <0.2 |
| 11 | 85 | 2 | 6 | 29 | <0.2 |

It is believed that mercury and sulphur are precipitated from the leach solution according to the following reactions.

$$Na_2HgS_{x+1} + H_2SO_4 \rightarrow Na_2SO_4 + HgS + (x-1)S + H_2S$$

$$Na_2S_x + H_2SO_4 \rightarrow Na_2SO_4 + (x-1)S + H_2S$$

$$2Na(HS_x) + H_2SO_4 \rightarrow Na_2SO_4 + (2x-2)S + 2H_2S$$

A retention time of as little as 2 minutes is sufficient to produce a solution containing 0.2 milligrams/liter (mg/L) mercury or less.

Other examples of the invention will also be readily apparent to a person skilled in the art, the scope of the invention being defined in the appended claims.

The embodiments of the invention in which an exclusive property or privilege is claimed, are defined as follows:

1. A process for producing elemental sulphur substantially free of mercury from elemental sulphur contaminated therewith comprising mixing said elemental sulphur in a molten state with an aqueous sulphide solution or an aqueous solution of a base selected from the group consisting of a sodium hydroxide solution and an ammonium hydroxide solution of sufficiently high pH of at least 9 for reaction with said elemental sulphur to form an aqueous sulphide solution for extraction of mercury from the elemental sulphur into the aqueous sulphide solution, maintaining the aqueous sulphide solution at a pH of about 9 during contact with the elemental sulphur, and then separating the aqueous sulphide solution containing extracted mercury from the molten elemental sulphur to produce an elemental sulphur product containing less than 2 g/t mercury, and in which a base is added at about 30 seconds before the end of the extraction step in an amount sufficient to increase the pH of the aqueous solution above about 9 for redissolution of precipitated mercury to be removed without significant reaction of the base with elemental sulphur.

2. A process as claimed in claim 1 in which the base is sodium hydroxide solution.

3. A process as claimed in claim 1 in which mercury is removed from the separated aqueous solution containing said mercury by adjusting the pH of the aqueous sulphide solution to a sufficiently low value of about pH 5 for precipitating mercury, and separating the precipitated mercury from the aqueous solution.

4. A process as claimed in claim 3 in which the pH of the aqueous sulphide solution is lowered to about 5 by the addition of sulphuric acid.

5. In a process as claimed in claim 1, mixing said elemental sulphur in a molten state with an aqueous sulphide solution or an aqueous solution of sufficiently high pH of at least 9 for reaction with said elemental sulphur to form an aqueous sulphide solution in a first stage for extraction of a substantial portion of the mercury from the elemental sulphur, settling and separating the molten elemental sulphur from the aqueous solution and mixing the separated molten elemental sulphur with caustic solution in a second stage to maintain the pH of the aqueous sulphide solution at at least about 9 during contact with the molten elemental sulphur for substantial extraction of residual mercury from the elemental sulphur, and settling and discharging the molten elemental sulphur as product substantially free of mercury from the second stage.

6. In a process as claimed in claim 5, maintaining said first and second stages at a temperature in the range of about 120° to about 155° C.

7. In a process as claimed in claim 5, maintaining said first and second stages at a temperature of about 125° C.

8. In a process as claimed in claim 6, mixing the elemental sulphur in the first and second stages with sodium hydroxide solution.

9. In a process as claimed in claim 5, 6, 7, or 8, extracting and recycling aqueous solution from the second stage to the first stage for contacting and mixing with elemental sulphur feed in the first stage.

10. In a process as claimed in claim 5, 6, 7, or 8, extracting the aqueous solution from the first stage and adjusting the pH of the aqueous solution to a sufficiently low value for precipitating mercury, and separating precipitated mercury from the aqueous solution.

11. In a process as claimed in claim 9, extracting the aqueous solution from the first stage and adjusting the pH of the aqueous solution to a sufficiently low value for precipitating mercury, and separating precipitated mercury form the aqueous solution.

12. In a process as claimed in claim 10, adjusting the pH of the said aqueous solution to about 5 by the addition of sulphuric acid.

* * * * *